United States Patent
Soller et al.

(10) Patent No.: US 8,317,005 B2
(45) Date of Patent: Nov. 27, 2012

(54) METHOD FOR REDUCING THE NOISE IN THE DRIVE TRAIN OF A MOTOR VEHICLE

(75) Inventors: Tobias Soller, Ismaning (DE); Thomas Ebert, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/196,656

(22) Filed: Aug. 2, 2011

(65) Prior Publication Data

US 2011/0284336 A1 Nov. 24, 2011

Related U.S. Application Data

(63) Continuation of application No. PCT/EP2010/000746, filed on Feb. 6, 2010.

(30) Foreign Application Priority Data

Feb. 20, 2009 (DE) .......................... 10 2009 009 861

(51) Int. Cl.
*F16H 57/12* (2006.01)
(52) U.S. Cl. ................. 192/3.63; 192/30 V; 192/113.34
(58) Field of Classification Search ................. 192/30 V
See application file for complete search history.

(56) References Cited

U.S. PATENT DOCUMENTS

| | | | | |
|---|---|---|---|---|
| 2002/0157914 A1 * | 10/2002 | Bassett | ........................ | 192/30 V |
| 2008/0071450 A1 | 3/2008 | Kurrle et al. | | |
| 2010/0018828 A1 | 1/2010 | Maerkl et al. | | |

FOREIGN PATENT DOCUMENTS

| | | |
|---|---|---|
| DE | 33 30 332 A1 | 3/1985 |
| DE | 10 2006 008 207 A1 | 9/2006 |
| DE | 60 2005 000 435 T2 | 5/2007 |
| DE | 10 2006 044 273 A1 | 4/2008 |
| DE | 10 2007 004 182 A1 | 7/2008 |
| DE | 10 2008 032 757 A1 | 1/2010 |
| EP | 1 617 108 A1 | 1/2006 |
| EP | 1 903 239 A2 | 3/2008 |
| GB | 2 145 495 A | 3/1985 |
| JP | 3-113160 A | 5/1991 |

OTHER PUBLICATIONS

EPO machine translation of DE 10 2007 004 182 downloaded on Feb. 24, 2012.*
German Search Report dated Sep. 30, 2009 including partial English-language translation (Nine (9) pages).
International Search Report dated Jul. 26, 2010 including English-language translation (Six (6) pages).

* cited by examiner

*Primary Examiner* — Richard M. Lorence
(74) *Attorney, Agent, or Firm* — Crowell & Moring LLP

(57) ABSTRACT

A method reduces the noise in the drive train of a motor vehicle having an automatic transmission or a manual transmission with a controllable oil pressure supply and/or automatic starting clutch. An engine sided drive unit is connected to the transmission input shaft by way of a spline connection, wherein noises in the drive train are caused by a clearance fit in the spline connection between the engine sided drive unit and the transmission input shaft. The transmission control is adapted for reducing the noise when in neutral.

9 Claims, 1 Drawing Sheet

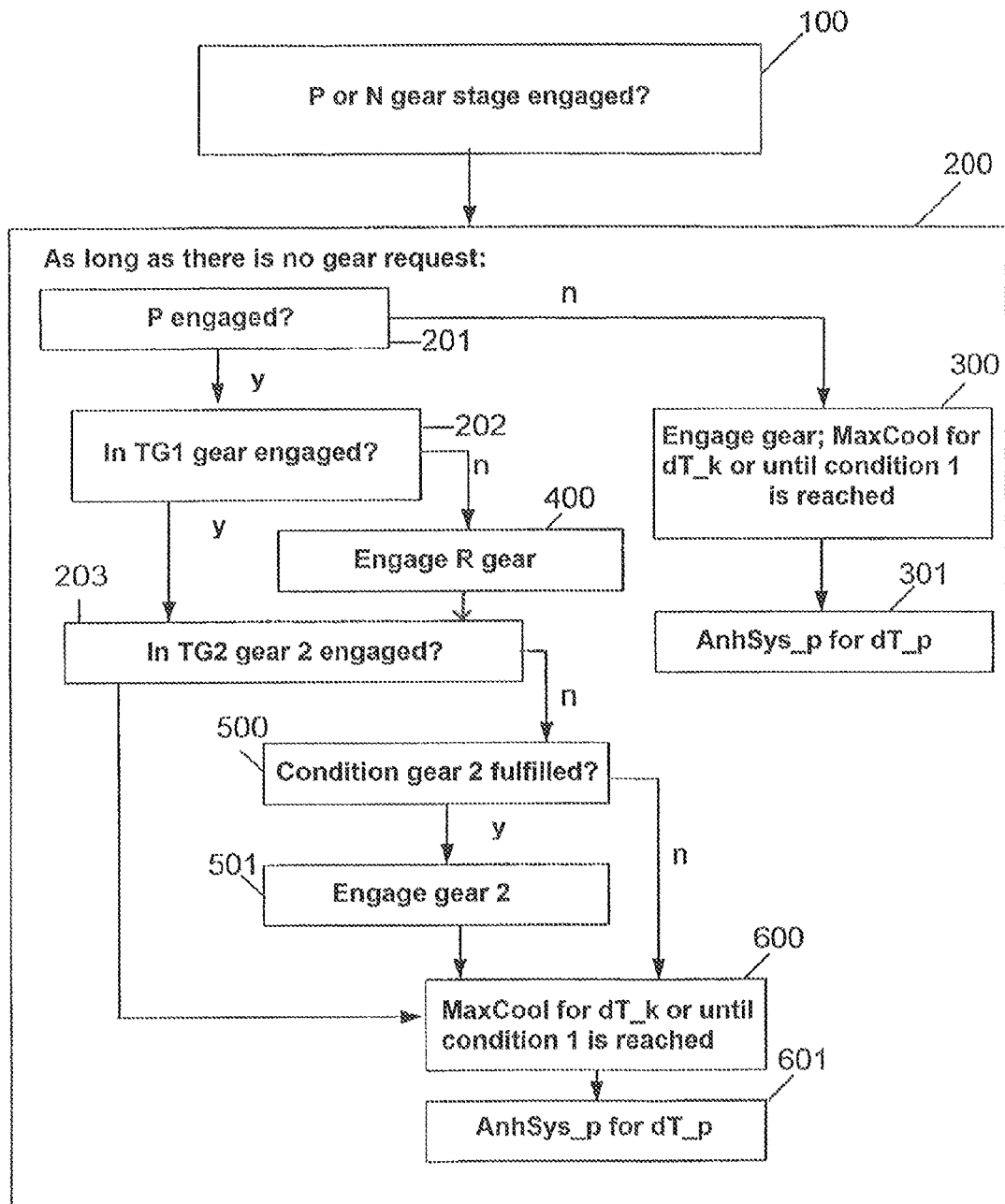

METHOD FOR REDUCING THE NOISE IN THE DRIVE TRAIN OF A MOTOR VEHICLE

CROSS-REFERENCE TO RELATED APPLICATIONS

This application is a continuation of PCT International Application No. PCT/EP2010/000746, filed Feb. 6, 2010, which claims priority under 35 U.S.C. §119 from German Patent Application No. DE 10 2009 009 861.5, filed Feb. 20, 2009, the entire disclosures of which are herein expressly incorporated by reference.

BACKGROUND AND SUMMARY OF THE INVENTION

The invention relates to a method for reducing the noise in the drive train of a motor vehicle when in neutral. The motor vehicle has an automatic transmission or a manual transmission with a controllable oil pressure supply and/or automatic starting clutch.

At the present time the power in the drive train of motor vehicles is transferred between the engine sided drive unit and the transmission input shaft by way of a spline connection. This spline connection can connect the engine sided drive shaft to the transmission input shaft either directly or through an interposed dual mass flywheel (which should be regarded as a part of the engine sided drive unit). Such dual mass flywheels are used predominantly for damping the rotational irregularities in the drive train between the crankshaft and the transmission input shaft, so that any amplitudes of vibration of the engine can be filtered out. This spline connection between the engine sided drive unit (with or without a dual mass flywheel) and the transmission input shaft usually has a clearance fit due to technical reasons related to assembly.

When in neutral, the rotational irregularity of the engine may cause a frequent engaging and disengaging of the tooth flanks of the gear tooth system in the spline connection exhibiting a clearance fit and located between the engine sided drive unit and the transmission input shaft.

This situation generates noises that are also known under the term "engine idle knock." Under some circumstances this noise may give rise to complaints.

In order to suppress such noises, measures have already been implemented in the direction of mechanical modifications. However, such mechanical solutions are complicated and expensive during production and implementation.

Therefore, the object of the invention is to provide a low cost solution for reducing the idling noises in the spline connection having a clearance fit.

This and other objects are achieved with a method for reducing the noise in the drive train of a motor vehicle having an automatic transmission or a manual transmission with a controllable oil pressure supply and/or automatic starting clutch, wherein the engine sided drive unit is connected to the transmission input shaft by a spline connection and the noises in the drive train are caused by the clearance fit in the spline connection between the engine sided drive unit and the transmission input shaft. The method adapts the transmission control for reducing the noise when in neutral.

The method according to the invention is intended, in particular, for motor vehicles having automatic transmissions, such as so-called dual clutch transmissions, where a spline connection is arranged at the interface between the drive unit and the transmission. However, it also lends itself well to vehicles having manual transmissions with a controllable oil pressure supply and/or automatic starting clutch. This spline connection connects the engine sided drive unit or, more specifically the drive shaft, to the transmission input shaft by way of a spline connection. As explained above, the engine sided drive unit can comprise a dual mass flywheel for damping rotational irregularities. Since the spline connection between the engine sided drive unit and the transmission input shaft usually has a clearance fit due to technical reasons related to assembly, the invention proposes for the purpose of reducing the noise, caused by the clearance fit in the spline connection, that the transmission control be adapted when in neutral such that the noise development can be eliminated or at least reduced. A purely software based implementation of the noise reduction does not incur any additional manufacturing costs in production.

It is advantageous to adapt the actuation of the transmission when in neutral in such a way that an increased torque is transmitted via the spline connection. This feature prevents the disengagement of the tooth flanks (a state that leads to noise development) or at least greatly reduces it.

There are a number of implementation possibilities for increasing the transmitted torque by adapting the transmission control. The measures proposed below relate to software based solutions that can be carried out predominantly in automatic transmissions that are in neutral position or park position.

In a first possible embodiment of the method according to the invention, the transmission control can be adapted when in neutral in such a way that the pump receiving torque of a hydraulic pump, which is provided for the hydraulic actuation, is increased. The system pressure is advantageously increased in order to increase the pump receiving torque of the hydraulic pump.

As an alternative or in addition to this measure, the transmission control can also be adapted when in neutral in such a way that an increase in the drag torque transmitted from the clutch is attained. That is, when in neutral the drag torque is increased in a targeted manner. Such an increase in the drag torque can be achieved, for example, by increasing the amount of cooling oil in the clutch. At the same time it is advantageous to ensure the slip in the clutch by, for example, engaging a gear stage of the transmission associated with this clutch.

As an alternative or in addition, a predetermined pressure value can be applied to the clutch assigned to this (part) transmission, assuming that no gear is engaged in the (part) transmission. In this case the pressure value can be variable. The result is a drag torque, which depends on the pressure exerted on the clutch, in the so-called rotary feedthrough unit.

As an alternative or in addition, a synchronization device can be actuated in a predetermined mode (for example, continuously or intermittently) after closing the clutch for transferring a defined torque without an engaged gear. In this case the maximum synchronization torque to be applied to the synchronization device is the clutch torque, where the synchronization has to be able to cope with this load that may be small, but still has to be applied continuously. Therefore, when in neutral the transmission control is adapted in such a way that a predefined synchronization torque is applied by way of a synchronization device to the clutch that is closed when the gear is not engaged. Then the synchronization torque generates a drag torque acting on the spline connection.

If the architecture of the set of wheels makes it possible to engage the reverse gear in a first part transmission and a forward gear in a second part transmission (for example, in dual clutch transmissions), then the transmission control can also be adapted in the respective gear position when in neutral in such a way that a torque, which is corrected by the signed gear change, is applied to both clutches assigned to the aforementioned part transmissions, in order to be finally "torque neutral" at the output. That is, the sum of the resulting clutch torques at the two clutches is approximately zero at the transmission output.

Finally, it is also contemplated to adapt the transmission control when in neutral in order to increase the transmitted torque at the spline connection in such a way that when the park stage is engaged and the gear stage is engaged in the respective (part) transmission, the corresponding clutch is actuated at least so far that the clutch torque transferred from the clutch is large enough to eliminate the noise.

Since the aforementioned measures differ in their capability to increase the transferred torque due to the different boundary conditions (type of transmission, situation, etc.), it is practical to combine the above described individual measures or to apply them in an alternating manner as a function of the situation. This would mean that the individual measures are implemented simultaneously at different points-in-time (thus in succession) and/or in different possible combinations so that the ratio of the measures can move between 0% and 100%. This strategy makes it easy to find transmission and situation specific solutions for reducing the noise when in neutral without having to accept the drawbacks of the individual measures.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE is a highly simplified flow chart illustrating an exemplary method for reducing noise in the drive train of a motor vehicle.

DETAILED DESCRIPTION OF THE DRAWING

The invention is explained in detail below by means of the following embodiment. In this respect, the single FIGURE is a highly simplified flowchart for reducing the noise in the drive train caused by the clearance fit of the spline connection between the engine sided drive unit and the transmission input shaft by adapting the transmission control in the example of a dual clutch transmission. A dual clutch transmission usually consists of two part transmissions, where the individual gears are split between the two part transmissions. In the example, it is assumed that the first part transmission includes at least the reverse gear; and the second part transmission includes the second gear stage. Each part transmission is assigned a separate clutch.

The routine begins at step 100 to prompt whether the transmission is in neutral position N or whether the park stage P is engaged. In addition, additional parameters, such as the vehicle speed, can be prompted and flow into the decision for initiating the transmission control adaptation for reducing the noise.

If the aforementioned conditions are fulfilled, then the routine advances to step 200, where the adaptation of the transmission control for noise reduction takes place. At the same time the current transmission situation is analyzed under the condition that no gear request of the driver is detected; and then suitable measures are initiated based on the situation results.

The routine begins at step 201 to prompt whether the park stage P is engaged. If the park stage P is not engaged (that means that the transmission is in neutral position N), the measure for noise reduction includes adapting the transmission control in step 300 in such a way that a gear is engaged in at least one part transmission, and a subroutine MaxCool is started. The start of the subroutine MaxCool leads to an increase in the amount of cooling oil, a state that in turn results in a targeted increase in the drag torque in the corresponding clutch and/or in both clutches. This subroutine MaxCool is terminated when a predetermined time interval dT_K has expired or a brake actuation is detected. Furthermore, a subroutine AnhSys_p is started (step 301), which causes an increase in the system pressure and, thus, an increase in the pump receiving torque of the hydraulic pump. This subroutine AnhSys_p is terminated when a predetermined time interval dT_p has expired.

If step 201 detects that the transmission is in park position P, then in a next step 202 the routine will prompt whether a gear is engaged in a first part transmission TG1 (to which the reverse gear R is also assigned).

If this is not the case, then the reverse gear R is engaged (step 400). Depending on the layout of the transmission, it is also possible to engage any other gear in this first part transmission. As soon as the reverse gear R is engaged, the routine advances to step 203. Similarly the routine advances from step 202 to step 203, when it is detected that a gear of any kind has already been engaged in the first part transmission TG1.

The next step involves checking the second part transmission TG2 in step 203 as to whether the second gear stage is engaged. If this is not the case, then the routine checks in a next step 500 whether all of the specified conditions that allow an engagement of the second gear are fulfilled. If this is the case, then the second gear stage is engaged in the second part transmission TG2 (step 501).

Irrespective of whether the second gear stage has already been engaged (step 203), was engaged (step 501), or an engagement of the second gear stage is not allowed (step 500), the routine then advances to steps 600 and 601. At the same time the subroutines MaxCool and AnhSys_p are started analogous to steps 300 and 301.

In addition to the aforementioned terminating conditions, the prompting and the initiated measures are also terminated when a gear request is detected. As an alternative to this embodiment, any other combinations for noise reduction by increasing the transferred torque at the interface are also contemplated. On the whole, the method according to the invention has the advantage that the described software sided measures can at least reduce the disturbing noise when in neutral in manual transmissions having a controllable oil pressure supply and/or an automatic starting clutch.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for reducing noise in a drive train of a motor vehicle having an automatic or manual transmission with at least one of a controllable oil pressure supply and an automatic starting clutch, wherein an engine sided drive unit is connected to a transmission input shaft via a spline connection susceptible to causing noise due to a clearance fit in the spline connection, the method comprising the acts of:

determining whether the transmission is in one of neutral and a park stage; and adapting a transmission control for reducing noise in the drive train caused by the clearance fit in the spline connection when in neutral, such that when a park stage is engaged and a gear stage is engaged, a corresponding clutch is actuated at least so far that a clutch torque, transferred from the clutch, is sufficiently large to reduce the noise.

2. The method according to claim 1, wherein the act of adapting the transmission control when in neutral comprises transmitting an increased torque via the spline connection.

3. The method according to claim 1, further comprising the act of adapting the transmission control when the park stage of the transmission is engaged.

4. The method according to claim 1, wherein the act of adapting the transmission control when in neutral is carried out by increasing a pump receiving torque of a hydraulic pump in order to increase system pressure.

5. The method according to claim 1, wherein the act of adapting the transmission control when in neutral comprises increasing a drag torque transmitted from the clutch.

6. The method according to claim 5, wherein the act of increasing the drag torque comprises increasing an amount of cooling oil in a wet clutch.

7. The method according to claim 6, wherein the act of adapting the transmission control when in neutral is carried out such that a pressure value is applied to the clutch assigned to a first part of a multi-part transmission when no gear is engaged in order to transmit an additional drag torque.

8. A method for reducing noise in a drive train of a motor vehicle having an automatic or manual transmission with at least one of a controllable oil pressure supply and an automatic starting clutch, wherein an engine sided drive unit is connected to a transmission input shaft via a spline connection susceptible to causing noise due to a clearance fit in the spline connection, the method comprising the acts of:
- determining whether the transmission is in one of neutral and a park stage; and
- adapting a transmission control for reducing noise in the drive train caused by the clearance fit in the spline connection when in neutral,
- wherein the transmission comprises a two-part transmission for various gear stages, the act of adapting the transmission control when in neutral being carried out such that a reverse gear is engaged in a first part transmission comprising the reverse gear, and a forward gear is engaged in a second part transmission; and the method further comprising the act of:
- applying a pressure value to clutches respectively assigned to the part transmissions such that a sum of resulting torques at a transmission output is neutral.

9. A method for reducing noise in a drive train of a motor vehicle having an automatic or manual transmission with at least one of a controllable oil pressure supply and an automatic starting clutch, wherein an engine sided drive unit is connected to a transmission input shaft via a spline connection susceptible to causing noise due to a clearance fit in the spline connection, the method comprising the acts of:
- determining whether the transmission is in one of neutral and a park stage; and
- adapting a transmission control for reducing noise in the drive train caused by the clearance fit in the spline connection when in neutral,
- wherein the act of adapting the transmission control when in neutral is carried out such that a clutch is closed when a gear is not engaged, and a predefined synchronization torque is applied by a synchronization device.

* * * * *